(12) United States Patent
Aoki et al.

(10) Patent No.: US 9,245,171 B2
(45) Date of Patent: Jan. 26, 2016

(54) GAZE POINT DETECTION DEVICE AND GAZE POINT DETECTION METHOD

(71) Applicant: FUJITSU LIMITED, Kawasaki-shi, Kanagawa (JP)

(72) Inventors: Yasuhiro Aoki, Kawasaki (JP); Masami Mizutani, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 408 days.

(21) Appl. No.: 13/942,986

(22) Filed: Jul. 16, 2013

(65) Prior Publication Data
US 2014/0078282 A1   Mar. 20, 2014

(30) Foreign Application Priority Data
Sep. 14, 2012   (JP) ................. 2012-202501

(51) Int. Cl.
*G06K 9/00*   (2006.01)
(52) U.S. Cl.
CPC ........ *G06K 9/00221* (2013.01); *G06K 9/00228* (2013.01); *G06K 9/00845* (2013.01)
(58) Field of Classification Search
None
See application file for complete search history.

(56) References Cited

U.S. PATENT DOCUMENTS

2009/0128311 A1   5/2009   Nishimura et al.
2012/0200490 A1*  8/2012   Inada ........................... 345/156

FOREIGN PATENT DOCUMENTS

| JP | 6-189906 | 7/1994 |
| JP | 2003-274393 | 9/2003 |
| JP | 2005-251111 | 9/2005 |
| JP | 2009-43003 | 2/2009 |
| WO | WO 2007/069489 A1 | 6/2007 |

* cited by examiner

*Primary Examiner* — Dave Czekaj
*Assistant Examiner* — Nam Pham
(74) *Attorney, Agent, or Firm* — Staas & Halsey LLP

(57) ABSTRACT

A gaze point detection device includes a processor; and a memory which stores a plurality of instructions, which when executed by the processor, cause the processor to execute, capturing an image of at least part of a scene around a vehicle; detecting a direction of a line of sight of a person in the vehicle; determining an intersection between a plane and a line of sight of the person in the vehicle, the plane being along a running direction of the vehicle and apart from the vehicle by a given distance; and presenting a resultant projected point on the image as a gaze point.

6 Claims, 6 Drawing Sheets

GAZE POINT DETECTION DEVICE AND GAZE POINT DETECTION METHOD

CROSS-REFERENCE TO RELATED APPLICATION

This application is based upon and claims the benefit of priority from the prior Japanese Patent Application No. 2012-202501 filed on Sep. 14, 2012, the entire contents of which are incorporated herein by reference.

FIELD

The embodiments discussed herein are related to a gaze point detection device configured to detect, for example, a point gazed at by a person in a vehicle, a gaze point detection method, and a computer-readable storage medium storing a gaze point detection program.

BACKGROUND

In recent years, a technique has been proposed to assist a driver to drive a vehicle by detecting a point gazed at by the driver and identifying a point, corresponding to the gaze point, on a captured image of a scene around the vehicle.

Japanese Laid-open Patent Publication No. 2009-43003 discloses a drive assist apparatus configured to capture an image of a face of a driver and detect an angle of a line of sight of a right eye of the driver and an angle of a line of sight of a left eye based on the captured image of the face of the driver. Furthermore, the drive assist apparatus detects a line-of-sight vector extending from the center between the left and right eyes to an intersection between a vector indicating the angle of the line of sight of the right eye and a vector indicating the angle of the line of sight of the left eye.

Japanese Laid-open Patent Publication No. 6-189906 discloses an apparatus of detecting a direction of a line of sight configured to detect a direction of a line of sight of a person based on signals output from an eye camera and a 3-dimensional magnetic sensor worn by the person. When the person is seeing a distant point through a windshield, the apparatus of detecting the direction of the line of sight assumes that the point of gaze is at infinity and maps the point of gaze on an image generated by a TV camera capturing an image of a scene in front of the person.

International Publication Pamphlet No. WO 2007/069489 discloses a safety-travel assistance device configured to detect an object to be paid attention to by a driver from two images of a scene in front of a vehicle captured by two cameras. The safety-travel assistance device further determines a relative positional relationship between the vehicle and the object using a triangular method. Furthermore, this safety-travel assistance device detects a direction of a line of sight of a driver, for example, based on a pupil and corneal reflection. In this safety-travel assistance device, a 2-dimensional space is set between the object and the driver, and the object is mapped at a point where a line extending from an eye of the driver to the object intersects the 2-dimensional space. Furthermore, the direction of the line of sight of the driver is mapped into the 2-dimensional space. The safety-travel assistance device detects a relationship between the object and the direction of the line of sight in the 2-dimensional space.

SUMMARY

In accordance with an aspect of the embodiments, a gaze point detection device includes a processor; and a memory which stores a plurality of instructions, which when executed by the processor, cause the processor to execute, capturing an image of at least part of a scene around a vehicle; detecting a direction of a line of sight of a person in the vehicle; determining an intersection between a plane and a line of sight of the person in the vehicle, the plane being along a running direction of the vehicle and apart from the vehicle by a given distance; and projecting the intersection onto the image and presenting a resultant projected point on the image as a gaze point gazed at by the person in the vehicle.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENT

A gaze point detection device according to an embodiment is described below with reference to drawings. The gaze point detection device sets a virtual plane at a location apart from an outside-of-vehicle image capturing unit configured to capture an image of at least part of scene around a vehicle by a distance where there is a possibility that there is an object gazed to by a driver such that the virtual plane is parallel to a running direction of the vehicle, and the gaze point detection device determines an intersection between the virtual plane and the line of sight of the driver. Depending on the distance from the outside-of-vehicle image capturing unit to the intersection, the gaze point detection device projects the intersection onto an image generated by the outside-of-vehicle image capturing unit thereby identifying a gaze point of the driver on the image including at least part of the scene around the vehicle.

In the present embodiment, the gaze point detection device is assumed to be disposed in the drive assist apparatus. Note that the gaze point detection device may be used in other applications such as an apparatus configured to analyze what a driver is interested in, based on the gaze point of the driver. Alternatively, the gaze point detection device may detect a point gazed at by another person in the vehicle instead of detecting the point gazed at by the driver.

Figure 1:
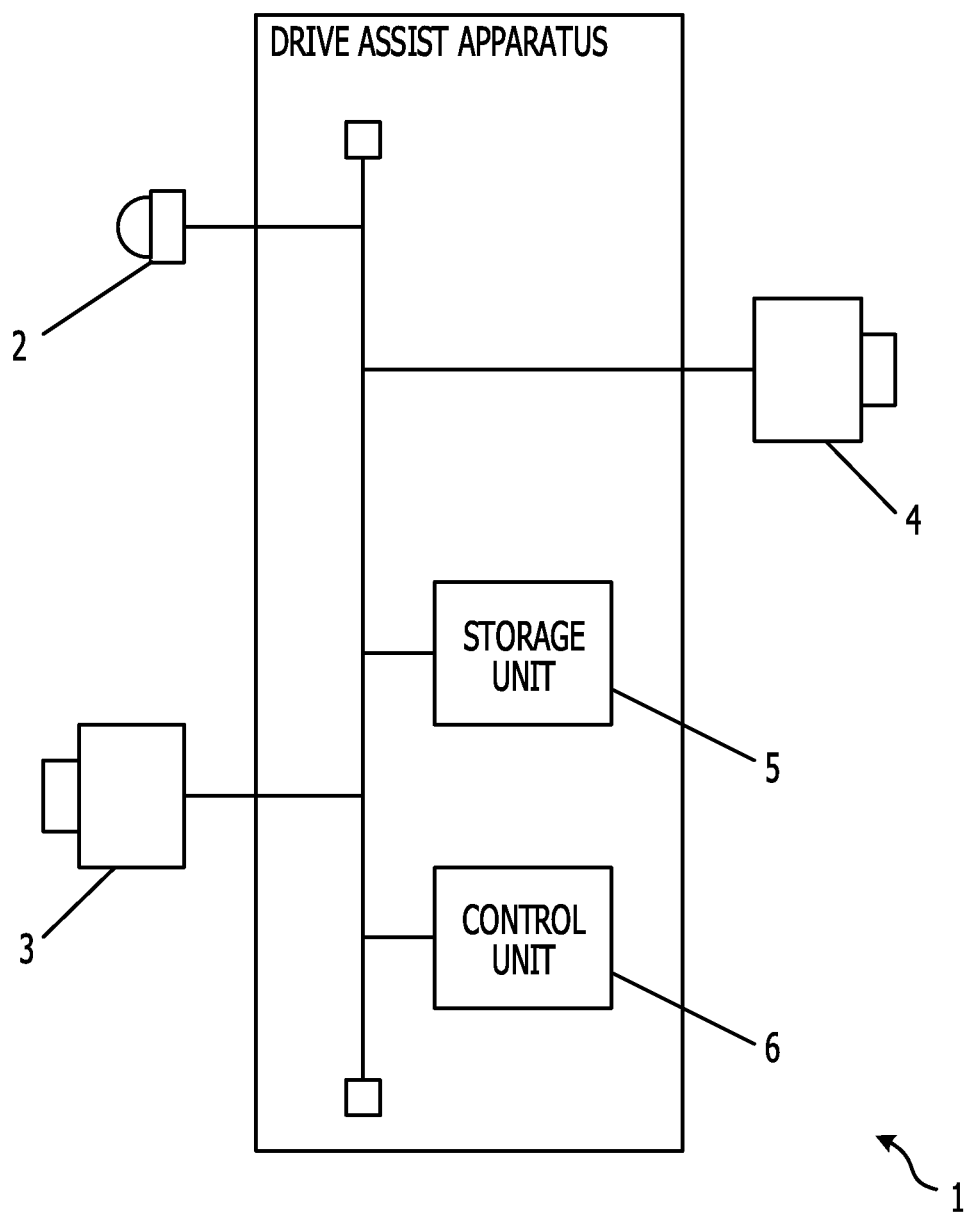
FIG. 1 is a diagram illustrating a configuration of a drive assist apparatus including a gaze point detection device according to an embodiment.
Figure 2:
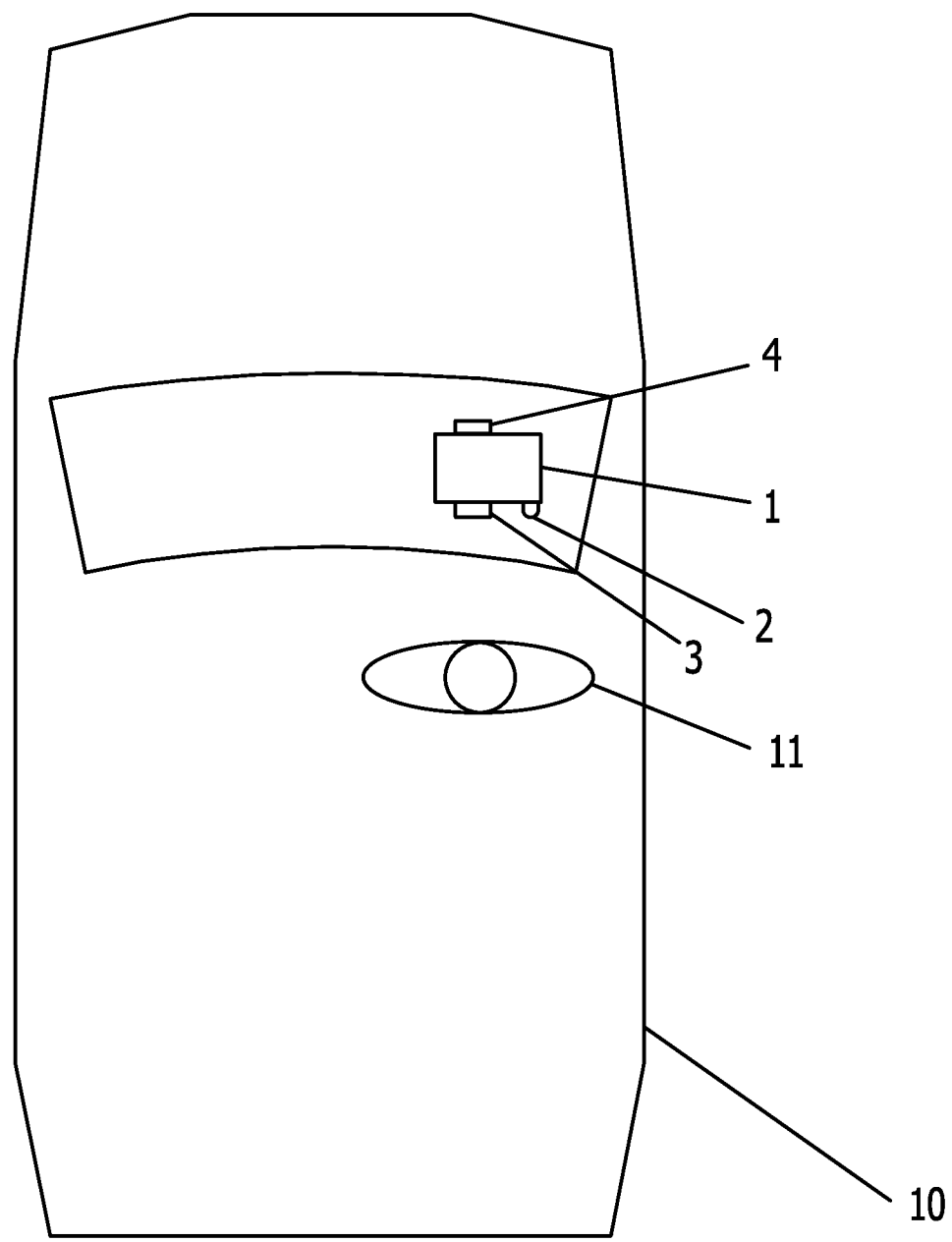
FIG. 2 is a diagram illustrating an example of a manner of disposing a drive assist apparatus in a vehicle.

FIG. 1 is a schematic diagram illustrating a drive assist apparatus including a gaze point detection device according to an embodiment. FIG. 2 is a diagram illustrating an example of a manner of disposing the drive assist apparatus in a vehicle. A drive assist apparatus 1 includes a light source 2, an inside-of-vehicle image capturing unit 3, an outside-of-vehicle image capturing unit 4, a storage unit 5, and a control unit 6. The drive assist apparatus 1 may further includes a display (not illustrated) for displaying an image generated by the outside-of-vehicle image capturing unit 4. The constituent elements of the drive assist apparatus 1 may be disposed in a single enclosure. In this case, the drive assist apparatus 1 may be installed on a dashboard of the vehicle 10 such that the outside-of-vehicle image capturing unit 4 is capable of capturing an image of at least part of a scene around the vehicle 10, and the inside-of-vehicle image capturing unit 3 is capable of capturing an image of a face of a driver 11.

Alternatively, some constituent elements of the drive assist apparatus 1 may be disposed separately from other constituent elements. For example, the light source 2 may be disposed on an instrument panel or at a location close to a ceiling in the front of the vehicle such that the light source 2 emits light toward the driver 11. The inside-of-vehicle image capturing unit 3 may also be installed on the instrument panel or at a location close to the ceiling in the front of the vehicle such that the inside-of-vehicle image capturing unit 3. The outside-of-vehicle image capturing unit 4 may be installed so as to be capable of capturing at least part of a scene around the vehicle 10, and more specifically, for example, the outside-of-vehicle image capturing unit 4 may be installed so as to be capable of capturing a scene in front of the vehicle 10. The light source 2, the inside-of-vehicle image capturing unit 3, and the outside-of-vehicle image capturing unit 4 may be connected via a signal line to a housing including a storage unit 5 and a control unit 6 and disposed on the backside of the instrument panel or on the dashboard.

The light source 2 illuminates a face of a user, and more particularly, eyes and surrounding areas. The light source 2 includes, for example, at least an infrared light emitting diode and a driving circuit configured to supply electric power to the infrared light emitting diode from a power supply (not illustrated) in accordance with a control signal supplied from the control unit 6. In accordance with the control signal received from the control unit 6, the light source 2 turns on or off to emit illumination light. The number of light sources 2 of the drive assist apparatus 1 is not limited to one, but the drive assist apparatus 1 may include a plurality of light sources 2.

The inside-of-vehicle image capturing unit 3 generates an image including a face of the driver for use in detecting a direction of the line of sight of the driver. To this end, the inside-of-vehicle image capturing unit 3 includes an image sensor including a solid-state image sensor elements having sensitivity to light emitted from the light source 2 and arranged in a two-dimensional array and an imaging optical system configured to form an image of the face of the driver on the image sensor. To suppress detection of a reflection image by an iris and suppress detection of a corneal reflection image by light other than the light from the light source 2, the inside-of-vehicle image capturing unit 3 may further include a visible light cutoff filter located between the image sensor and the imaging optical system. The inside-of-vehicle image capturing unit 3 may be disposed, for example, at a location close to the light source 2 such that an image of the light source 2 is formed in a user's cornea on the inside-of-vehicle image.

The number of pixels of the image sensor of the inside-of-vehicle image capturing unit 3 may be set to 100 millions, 200 millions, or 400 millions such that the image sensed by the image sensor has a resolution that allows it to detect a Purkinje image of the light source 2. The image sensor may generate a color image. Alternatively, the image sensor may generate a gray image such that the luminance of each pixel increases with the intensity of light received by the solid-state image sensor element.

The inside-of-vehicle image capturing unit 3 generates images including the face of the driver as follows. That is, as long as a gaze point detection process is being performed, the inside-of-vehicle image capturing unit 3 captures an image of the face of the driver at a predetermined rate (for example, 10 to 30 frames/second) according to an exposure condition specified by the control unit 6 thereby generating a sequence of images each including the face of the driver. The inside-of-vehicle image capturing unit 3 outputs the generated image to the control unit 6 each time the image is generated. Hereinafter, the image generated by the inside-of-vehicle image capturing unit 3 will be referred to simply as an inside-of-vehicle image.

The outside-of-vehicle image capturing unit 4 is installed such that the outside-of-vehicle image capturing unit 4 is capable of capturing an image of, at least, part of a scene around the vehicle 10. The outside-of-vehicle image capturing unit 4 generates an image including at least part of the scene periodically at a predetermined rate (for example, 10 to 30 frames per second). To this end, the outside-of-vehicle image capturing unit 4 includes an image sensor including solid-state image sensor elements arranged in a two-dimensional array and an imaging optical system configured to form an image of a scene in from the of the vehicle on the image sensor. In the present embodiment, the outside-of-vehicle image capturing unit 4 is disposed such that the optical axis of the outside-of-vehicle image capturing unit 4 is parallel to a direction in which the vehicle 10 moves and the outside-of-vehicle image capturing unit 4 is capable of capturing an image of a scene in front of the vehicle 10. The outside-of-vehicle image capturing unit 4 may be capable of capturing an image of a scene on a left-hand side or right-hand side of the vehicle 10. The outside-of-vehicle image capturing unit 4 may generate a color image or a gray image. The outside-of-vehicle image capturing unit 4 outputs the generated image to the control unit 6 each time the image is generated. Hereinafter, the image generated by the outside-of-vehicle image capturing unit 4 will be referred to simply as an outside-of-vehicle image.

The storage unit 5 includes, for example, a read-write non-volatile or volatile semiconductor memory and a read-only non-volatile semiconductor memory. The storage unit 5 stores a program executed by the control unit 6 to perform a gaze point detection process. The storage unit 5 also stores various kinds of data used in detecting a driver's gaze point on the outside-of-vehicle image.

The control unit 6 includes one or more processors and associated one or more peripheral circuits. The control unit 6 is connected to various units in the drive assist apparatus 1 via signal lines. The control unit 6 controls the various units in the drive assist apparatus 1 by transmitting control signals to the various units in the drive assist apparatus 1 via the signal lines.

Figure 3:
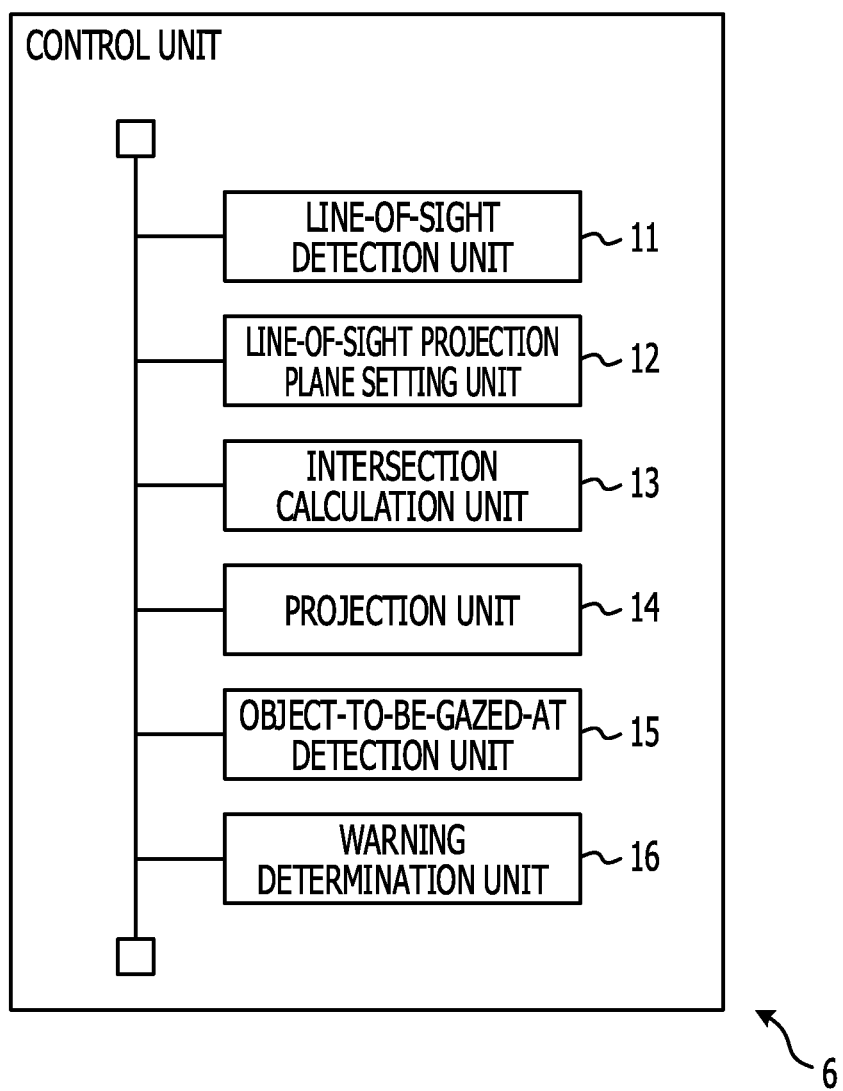
FIG. 3 is a diagram illustrating functional blocks of a control unit.

FIG. 3 is a diagram illustrating functional blocks of the control unit 6. The control unit 6 includes a line-of-sight detection unit 11, a line-of-sight projection plane setting unit 12, an intersection calculation unit 13, a projection unit 14, an object-to-be-gazed-at detection unit 15, and a warning determination unit 16. Of these units, the line-of-sight detection unit 11, the line-of-sight projection plane setting unit 12, the intersection calculation unit 13 and the projection unit 14 are included in the gaze point detection device. These units included in the control unit 6 are function modules realized by a computer program executed on the processor included in the control unit 6. These units included in the control unit 6 may be integrated in a single integrated circuit including circuits corresponding to the respective units, and the integrated circuit may be disposed in the drive assist apparatus 1 separately from the processor included in the control unit 6.

Each time the control unit 6 receives an inside-of-vehicle image from the inside-of-vehicle image capturing unit 3, the line-of-sight detection unit 11 detects a direction of the line of sight of the driver based on the inside-of-vehicle image. More specifically, in the present embodiment, the line-of-sight detection unit 11 detects a Purkinje image of the light source 2 reflected by a cornea of a driver on the inside-of-vehicle image and further detects a driver's pupil barycenter. Based on a positional relationship between the Purkinje image and the pupil barycenter, the line-of-sight detection unit 11 detects the direction of the line of sight of the driver.

Furthermore, for example, the line-of-sight detection unit 11 detects an area including a face of the driver on the inside-of-vehicle image. In the present embodiment, the face of the driver is illuminated with infrared light emitted from the light source 2 in during an image capture operation. Human skin has a relatively high reflectivity to infrared light (more specifically, for example, the reflectivity of human skin is about several ten percent in a near-infrared range). Therefore, pixels of the skin of the face have high luminance on the inside-of-vehicle image. On the other hand, an area of hair or a background area behind a user has a low reflectivity to infrared light or is far from the light source 2, and thus pixels in the area of hair or the background area behind the user are relatively low in luminance. Thus, in a case where the inside-of-vehicle image is a color image in which pixel values are expressed in an RGB color space, the line-of-sight detection unit 11 converts the pixel values into values in a YUV color space. The line-of-sight detection unit 11 then extracts pixels having a luminance component (Y component) value equal to or greater than a predetermined threshold value and employs the extracted pixels as face area candidate pixels that may be in a face area. In a case where each pixel of the inside-of-vehicle image represents a luminance value of a gray image, the line-of-sight detection unit 11 compares the value of each pixel with a predetermined threshold value. The predetermined threshold value may set to be equal to, for example, 0.8 times the maximum value of the luminance component on the image.

It is possible to predict, to a certain degree, the size of the driver's face area occupied in the inside-of-vehicle image. Thus, the line-of-sight detection unit 11 performs labeling on the face area candidate pixels to extract a set of face area candidate pixels located adjacent to each other as a face candidate area. The line-of-sight detection unit 11 then determines whether the size of the face candidate area falls within a predetermined range corresponding to the size of the face of the user. If the size of the face candidate area is within the predetermined range corresponding to the size of the face of the user, the line-of-sight detection unit 11 determines that the face candidate area is a face area including the face of the driver.

Alternatively, the line-of-sight detection unit 11 may employ other methods to detect a face area on an image. For example, the line-of-sight detection unit 11 may perform template matching between the face candidate area and a template having a general face shape, and calculate the degree of matching between the face candidate area and the template. When the degree of matching is equal to or greater than a predetermined value, the face candidate area may be determined as a face area.

Next, the line-of-sight detection unit 11 detects an area corresponding to an eye in the face area. Pixels in the eye area have luminance greatly different from the luminance of pixels in an area surrounding the eye. Thus, the line-of-sight detection unit 11 detects edge pixels at which a change in luminance in a vertical direction occurs, for example, by calculating a difference between vertically adjacent pixels using, for example, a Sobel filter or the like. The line-of-sight detection unit 11 then detects an area surrounded by two edge lines each including edge pixels adjacent to each other extending in a substantially horizontal direction over a length corresponding to the size of the eye. Alternatively, the line-of-sight detection unit 11 may perform template matching between a template representing an eye on an image and a face area to detect an area, in the face area, having a highest degree of matching with the template, and the line-of-sight detection unit 11 may employ the detected area as an eye area.

After an eye area is detected, the line-of-sight detection unit 11 detects a pupil area in the eye area. In the present embodiment, the line-of-sight detection unit 11 performs matching between the eye area and a template corresponding to a pupil to detect an area having a highest degree of matching with the template within the eye area. In a case where the maximum degree of matching is higher than a predetermined matching degree threshold value, the line-of-sight detection unit 11 determines that the detected area is an area of a pupil image. Alternatively, the line-of-sight detection unit 11 may employ other methods to detect a pupil area on an image.

Furthermore, the line-of-sight detection unit 11 detects a Purkinje image of the light source 2 in the eye area. The luminance in the area of the Purkinje image of the light source 2 is higher than that in a surrounding area. The shape of the area of the Purkinje image of the light source 2 is substantially similar to the shape of a light emitting surface of the light source 2. Thus, the line-of-sight detection unit 11 sets, in the eye area, two rings that are different in size from each other and are substantially similar in shape to the contour shape of the light emitting surface of the light source 2 such that the center of each ring is at the same location. The line-of-sight detection unit 11 then detects an area in which a difference value, obtained by subtracting the mean value of luminance of pixels located outside an area corresponding to the inner ring from an inner luminance mean value indicating the mean value of luminance of pixels located in the area corresponding to the inner ring, is greater than a predetermined difference threshold value and the inner luminance mean value is higher than a predetermined luminance threshold value. The line-of-sight detection unit 11 further extracts an area located in the detected area and surrounded by the inner ring. The line-of-sight detection unit 11 regards the extracted area as a Purkinje image of the light source 2. The difference threshold value may be, for example, a mean value of difference values among neighboring pixels in the eye area. The predetermined luminance threshold value may be set to be equal to, for example, 80% of the maximum luminance value in the eye area. Alternatively, the line-of-sight detection unit 11 may employ other methods to detect an area, on an image, including a Purkinje image of the light source.

The line-of-sight detection unit 11 then determines the coordinates of the barycenter of the Purkinje image by calculating the mean value of horizontal coordinate values and the mean value of vertical coordinate values of pixels included in the Purkinje image and employing the calculated mean values as the coordinates of the barycenter of the Purkinje image.

Because the surface of the cornea is nearly spherical, the Purkinje image of the light source 2 is formed at a substantially fixed position regardless of the direction of the line of sight of the driver. On the other hand, the pupil barycenter moves depending on the direction of the line of sight of the driver. Therefore, the line-of-sight detection unit 11 is capable of detecting the direction of the line of sight of the driver by determining a relative location of the pupil barycenter with respect to the barycenter of the Purkinje image.

In the present embodiment, the line-of-sight detection unit 11 determines the relative location of the pupil barycenter with respect to the barycenter of the Purkinje image of the light source, for example, by subtracting the horizontal coordinate and the vertical coordinate of the barycenter of the Purkinje image from the horizontal coordinate and the vertical coordinate of the pupil barycenter. The line-of-sight detection unit 11 then determines the direction of the line of sight of the driver by referring to a line-of-sight direction reference table representing the relationship between the relative location of the pupil barycenter and the direction of the line of sight of the user. The line-of-sight direction reference table is produced in advance, for example, by detecting the location of the pupil barycenter and the location of the barycenter of the Purkinje image for each case in which the driver sees in one of various known directions, and the produced line-of-sight direction reference table is stored in the storage unit 5.

To detect the direction of the line of sight of the driver, the line-of-sight detection unit 11 may employ a method that does not use a Purkinje image. For example, the line-of-sight detection unit 11 may detect the direction of the line of sight of the driver based on the relative location of the pupil barycenter with respect to the location, on the inside-of-vehicle image, of a feature part of the face of the driver. More specifically, for example, the line-of-sight detection unit 11 determine coordinates, on the image, of a feature part such as a tip of nose, an inner corner of an eye, or the like, which does not have a large change in positional relationship with the eye. For this purpose, for example, the line-of-sight detection unit 11 performs template matching between the face area and a template having a common shape of the feature part while changing the relative location, and calculates the degree of matching between the face area and the template. When the degree of matching equal to or greater than a predetermined value is obtained at a particular location in the face area, the line-of-sight detection unit 11, determines that an image of the feature part corresponding to the template exists at this particular location.

The line-of-sight detection unit 11 determines a location correction amount by subtracting, from the coordinates of the feature part, coordinates of a reference location of the feature part which are determined from a reference image of the face of the driver facing in a particular direction and stored in the storage unit 5. The line-of-sight detection unit 11 then determines the corrected coordinates of the pupil barycenter by subtracting the location correction amount from the original coordinate values of the pupil barycenter thereby reducing the difference, corresponding to the location correction amount, between the location of the pupil barycenter on the inside-of-vehicle image and the location of the pupil barycenter on the reference image. The line-of-sight detection unit 11 refers to a pupil/line-of-sight direction reference table stored in the storage unit 5 and determines the direction of the line of sight of the driver corresponding to the corrected pupil barycenter location.

The direction of the line of sight of the driver may be represented by a unit vector in the world coordinate system. The line-of-sight detection unit 11 notifies the intersection calculation unit 13 of the unit vector representing the direction of the line of sight of the driver and the location of the eye on the inside-of-vehicle image.

The line-of-sight projection plane setting unit 12 sets, in at least part of a region around the vehicle 10, a line-of-sight projection plane that is a virtual plane onto which the line of sight of the driver is projected. More specifically, in the present embodiment, the line-of-sight projection plane setting unit 12 sets the line-of-sight projection plane such that the line-of-sight projection plane is parallel to the running direction of the vehicle 10 and is apart from the vehicle 10 by a distance where there is a possibility that there is an object to be paid attention to. In the present embodiment, for ease of treatment of the line-of-sight projection plane in the world coordinate system, the distance from the vehicle 10 to the line-of-sight projection plane is defined by the distance from the outside-of-vehicle image capturing unit 4 installed in the vehicle 10 to the line-of-sight projection plane. Alternatively, the distance from the vehicle 10 to the line-of-sight projection plane may be defined by the distance from the center line of the vehicle 10, parallel to a side face of the vehicle 10 to parallel to the running direction of the vehicle 10, to the line-of-sight projection plane.

Figure 4:
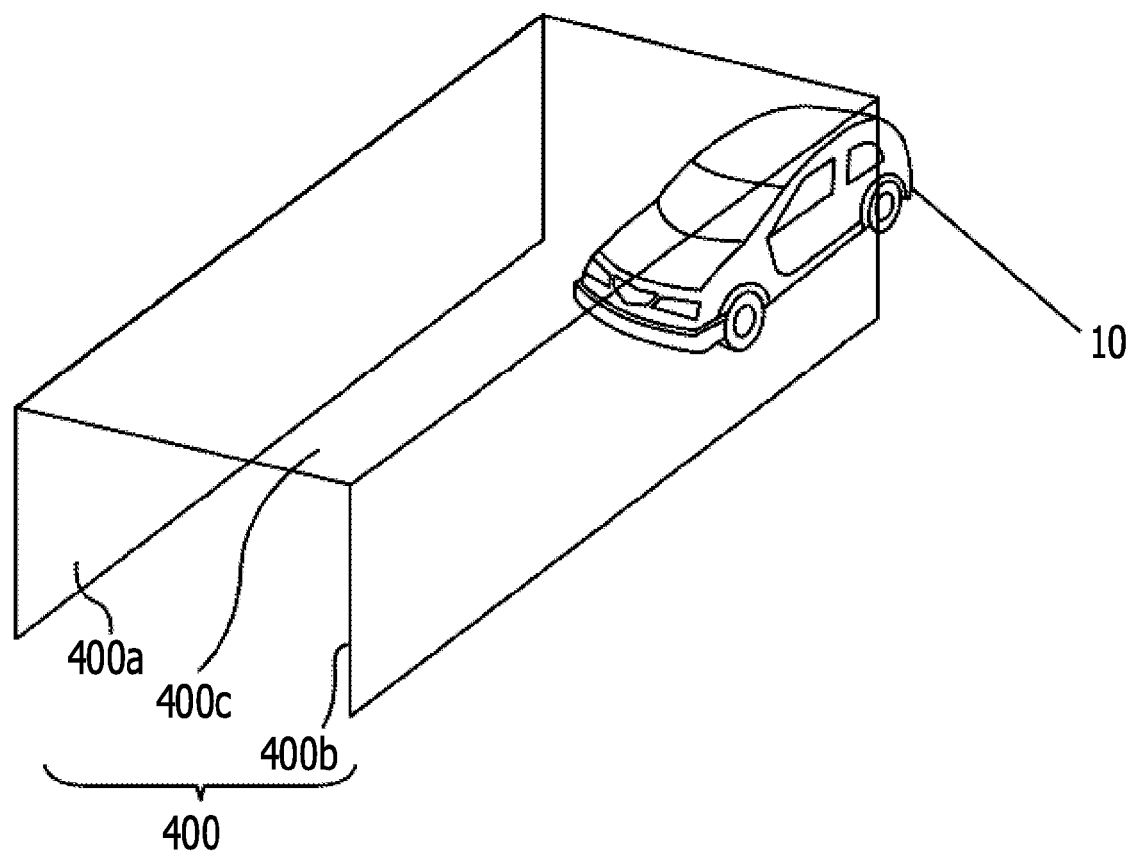
FIG. 4 is a diagram illustrating an example of a line-of-sight projection plane.

FIG. 4 is a diagram illustrating an example of a line-of-sight projection plane. As illustrated in FIG. 4, a line-of-sight projection plane 400 is set such that a left-hand side, a right-hand side, and an upper side of the vehicle 10 are surrounded by the line-of-sight projection plane 400. In this example, a line-of-sight projection plane 400a on the right-hand side and a line-of-sight projection plane 400b on the left-hand side are set such that they are perpendicular to a road surface. On the other hand, a line-of-sight projection plane 400c on the upper side is set such that it is parallel to the road surface. When a driver is driving a vehicle, a driver may gaze at another vehicle running in an oncoming lane or gaze at a pedestrian or a bicycle walking or running on a frontage road or a side road to avoid an accident such as a collision. In view of the above, the line-of-sight projection plane setting unit 12 sets the distance from the outside-of-vehicle image capturing unit 4 to the line-of-sight projection plane located on the right-hand side of the vehicle 10 so as to be equal to, for example, the distance from the outside-of-vehicle image capturing unit 4 to the oncoming lane or the distance from the outside-of-vehicle image capturing unit 4 to a right-hand edge of a road on which the vehicle 10 is running. This distance may be set in advance and stored in the storage unit 5.

Alternatively, the line-of-sight projection plane setting unit 12 may detect a center line drawn on a road on the outside-of-vehicle image or a right-hand edge of the road on the outside-of-vehicle image, and may estimate the distance from the outside-of-vehicle image capturing unit 4 to the center line or the right-hand edge of the road. To detect the center line drawn on the road on the outside-of-vehicle image or the right-hand edge of the road, the line-of-sight projection plane setting unit 12 may detect pixels located on an edge of a road area of the outside-of-vehicle image. The line-of-sight projection plane setting unit 12 may then perform, for example, a Hough transform on the edge pixels to detect a straight line extending along the running direction of the vehicle 10 in an area corresponding to the right-hand side of the vehicle 10 as the center line or the right-hand edge of the road. Alternatively, the line-of-sight projection plane setting unit 12 may employ other methods to detect the center line or the right-hand edge of the road.

The direction of the optical axis of the outside-of-vehicle image capturing unit 4 and the angle of view of the outside-of-vehicle image capturing unit 4 are known in advance. Therefore, it is possible to determine a direction from the outside-of-vehicle image capturing unit 4 to an arbitrary object represented by pixels on the outside-of-vehicle image. The height from the road surface to the outside-of-vehicle image capturing unit 4 is also known in advance. Therefore, the line-of-sight projection plane setting unit 12 is also capable of determining the distance from the outside-of-vehicle image capturing unit 4 to a road surface represented by pixels on the outside-of-vehicle image by identifying the pixels representing the road surface. Thus, based on some pixels representing the center line or the right-hand edge of the road, the line-of-sight projection plane setting unit 12 is capable of determining the distance from the outside-of-vehicle image capturing unit 4 to the center line or the right-hand edge of the road.

Let D denote the distance from the outside-of-vehicle image capturing unit 4 to the line-of-sight projection plane set on the right-hand side of the vehicle 10, then the line-of-sight projection plane s set on the right-hand side of the vehicle 10 may be represented by a following equation.

$$d \cdot s = 0 \tag{1}$$

$$d = \begin{bmatrix} D \\ 0 \\ 0 \\ -D^2 \end{bmatrix}, s = \begin{bmatrix} x \\ y \\ z \\ 1 \end{bmatrix}$$

where (x, y, z) denotes coordinates in the world coordinate system in which a front-side principal point of the outside-of-vehicle image capturing unit 4 is taken as the origin. More specifically, z denotes a coordinate in the running direction of the vehicle 10, that is, in a direction parallel to the optical axis of the outside-of-vehicle image capturing unit 4, x denotes a coordinate in a direction parallel to the road surface and perpendicular to the running direction of the vehicle 10, and y denotes a coordinate in a vertical direction perpendicular to the road surface. Note that x is positive in a direction from the origin to the right, y is positive in an upward direction from the origin, and z is positive in a forward running direction of the vehicle 10 from the origin.

Furthermore, the line-of-sight projection plane setting unit 12 sets the distance from the outside-of-vehicle image capturing unit 4 to the line-of-sight projection plane set on the left-hand side of the vehicle 10 so as to be equal to the distance from the outside-of-vehicle image capturing unit 4 to, for example, a left-hand edge of the road on which the vehicle 10 is running. Also in this case, the distance from the outside-of-vehicle image capturing unit 4 to the left-hand edge of the road on which the vehicle 10 is running may be stored in the storage unit 5 in advance. Alternatively, the line-of-sight projection plane setting unit 12 may determine the distance by detecting the left-hand edge of the road on the outside-of-vehicle image. When D denotes the distance from the outside-of-vehicle image capturing unit 4 to the line-of-sight projection plane set on the left-hand side of the vehicle 10, the line-of-sight projection plane s' set on the left-hand side of the vehicle 10 is given by replacing D in equation (1) with −D.

Furthermore, the line-of-sight projection plane setting unit 12 sets the distance from the outside-of-vehicle image capturing unit 4 to the line-of-sight projection plane located on the upper side of the vehicle 10 so as to be equal to a value corresponding to the height from the outside-of-vehicle image capturing unit 4 to, for example, a traffic sign or a traffic light (for example, 4 meters).

Note that the line-of-sight projection plane setting unit 12 may set the line-of-sight projection plane only on the right-hand side and on the left-hand side of the vehicle 10 and may not set the line-of-sight projection plane on the upper side of the vehicle 10, because, in general, there is no object approaching the vehicle 10 from above the vehicle 10. The line-of-sight projection plane setting unit 12 may set a line-of-sight projection plane having a cylindrical surface with a central axis parallel to the running direction of the vehicle 10 such that the vehicle 10 is surrounded by the cylindrical surface.

The line-of-sight projection plane setting unit 12 notifies the intersection calculation unit 13 of the equation representing the line-of-sight projection plane.

The intersection calculation unit 13 calculates an intersection between the line-of-sight projection plane and the driver's line of sight. When v(x, y, z) denotes a unit vector representing the direction of the line of sight of the driver and g(x, y, z) denotes the location of an eye of the driver in the world coordinate system in which the origin is taken at the front-side principal point of the outside-of-vehicle image capturing unit 4, the driver's line of sight is given by a line (g+kv) where k is a positive real number. Therefore, the intersection calculation unit 13 is capable of calculating the intersection between the line-of-sight projection plane and the driver's line of sight according to an equation described below in which v and g are represented in a homogeneous coordinate system, and v and g are respectively given by v=v(x, y, z, 0) and g=g(x, y, z, 1).

$$q = g - \frac{d \cdot g}{d \cdot v} v \tag{2}$$

The location of the eye of the driver may be determined, for example, based on the location of the eye detected from the inside-of-vehicle image generated by the inside-of-vehicle image capturing unit 3. There is a one-to-one correspondence between an arbitrary pixel on the inside-of-vehicle image and a direction to a subject represented by this pixel from the inside-of-vehicle image capturing unit 3. Therefore, it is possible to identify the direction from the inside-of-vehicle image capturing unit 3 to the eye of the driver by identifying a pixel corresponding to the barycenter of the eye on the inside-of-vehicle image. Because the direction of the optical axis, the angle of view, and the installation location of the inside-of-vehicle image capturing unit 3 are known, it is possible to determine a straight line extending from the inside-of-vehicle image capturing unit 3 to the eye of the driver in the world coordinate system. Furthermore, it is also possible to determine in advance the distance from the inside-of-vehicle image capturing unit 3 to the driver based on the positional relationship between the inside-of-vehicle image capturing unit 3 and a driver's seat. Therefore, it is assumed that the driver's eye is at a point being on the straight line and being apart from the inside-of-vehicle image capturing unit 3 by the estimated distance from the inside-of-vehicle image capturing unit 3 to the driver's eye. The location of the driver's eye may be measured in advance and stored in the storage unit 5.

Alternatively, in a state in which the location of the driver's eye in the real space is known, an inside-of-vehicle image of a head of the driver may be captured and the location of the eye on the inside-of-vehicle image may be determined and employed as a reference location of the eye and stored in the storage unit 5 in advance. The intersection calculation unit 13 may determine a difference between the location of the eye on the inside-of-vehicle image obtained in the gaze point detection process and the reference location of the eye, and may correct the location of the driver's eye corresponding to the reference location based on the determined difference thereby determining the location of the driver's eye. Alternatively, the intersection calculation unit 13 may employ other methods to detect the location of the driver's eye.

The intersection calculation unit 13 notifies the projection unit 14 of the coordinates of the intersection between the driver's line of sight and the line-of-sight projection plane.

The projection unit 14 projects the intersection between the driver's line of sight and the line-of-sight projection plane onto the outside-of-vehicle image. As described above, parameters associated with the outside-of-vehicle image capturing unit 4, including the installation location, the direction of the optical axis, the angle of view, and the pixel size of the outside-of-vehicle image capturing unit 4, are known. Therefore, in a case where the distortion of the imaging optical system of the outside-of-vehicle image capturing unit 4 is negligibly small, the projection unit 14 is capable of determining, based on those parameters, a projection matrix F that projects an arbitrary point in the world coordinate system on the outside-of-vehicle image. Alternatively, a chart of known patterns is put at a location apart by a particular distance from the outside-of-vehicle image capturing unit 4, and an image of the chart may be captured by the outside-of-vehicle image capturing unit 4 and the resultant image may be used in determining the elements of the projection matrix F. In this case, a plurality of feature points on the chart are extracted from the image of the chart, and values of elements of the projection matrix F are determined so as to minimize the sum of squares of distances between the respective feature points and coordinates of corresponding points on the outside-of-vehicle image onto which the corresponding points on the chart are projected via the projection matrix F. The projection matrix F may be calculated and stored in the storage unit 5, for example, when the drive assist apparatus 1 is installed in the vehicle 10 or when a calibration process is performed at scheduled intervals.

The projection unit 14 calculates a gaze point p(u, w) on the outside-of-vehicle image corresponding to the intersection q(x, y, z) between the driver's line of sight and the line-of-sight projection plane according to a following equation using the projection matrix F, in which u denotes a horizontal coordinate on the outside-of-vehicle image and w denotes a vertical coordinate on the outside-of-vehicle image.

$$p = Fq = F\left[g - \frac{d \cdot g}{d \cdot v} v\right] \quad (3)$$

$$F = \begin{bmatrix} f_x & 0 & 0 & 0 \\ 0 & f_y & 0 & 0 \\ 0 & 0 & 1 & 0 \end{bmatrix}$$

In equation (3), the intersection q and the corresponding gaze point p on the outside-of-vehicle image are represented in the homogeneous coordinate system. That is, if an uppermost element at the gaze point p obtained via equation (3) is multiplied by 1/z, then a horizontal coordinate u on the outside-of-vehicle image is obtained, while if a second uppermost elements at the gaze point p obtained via equation (3) is multiplied by 1/z, then a vertical coordinate w on the outside-of-vehicle image is obtained.

Figure 5:
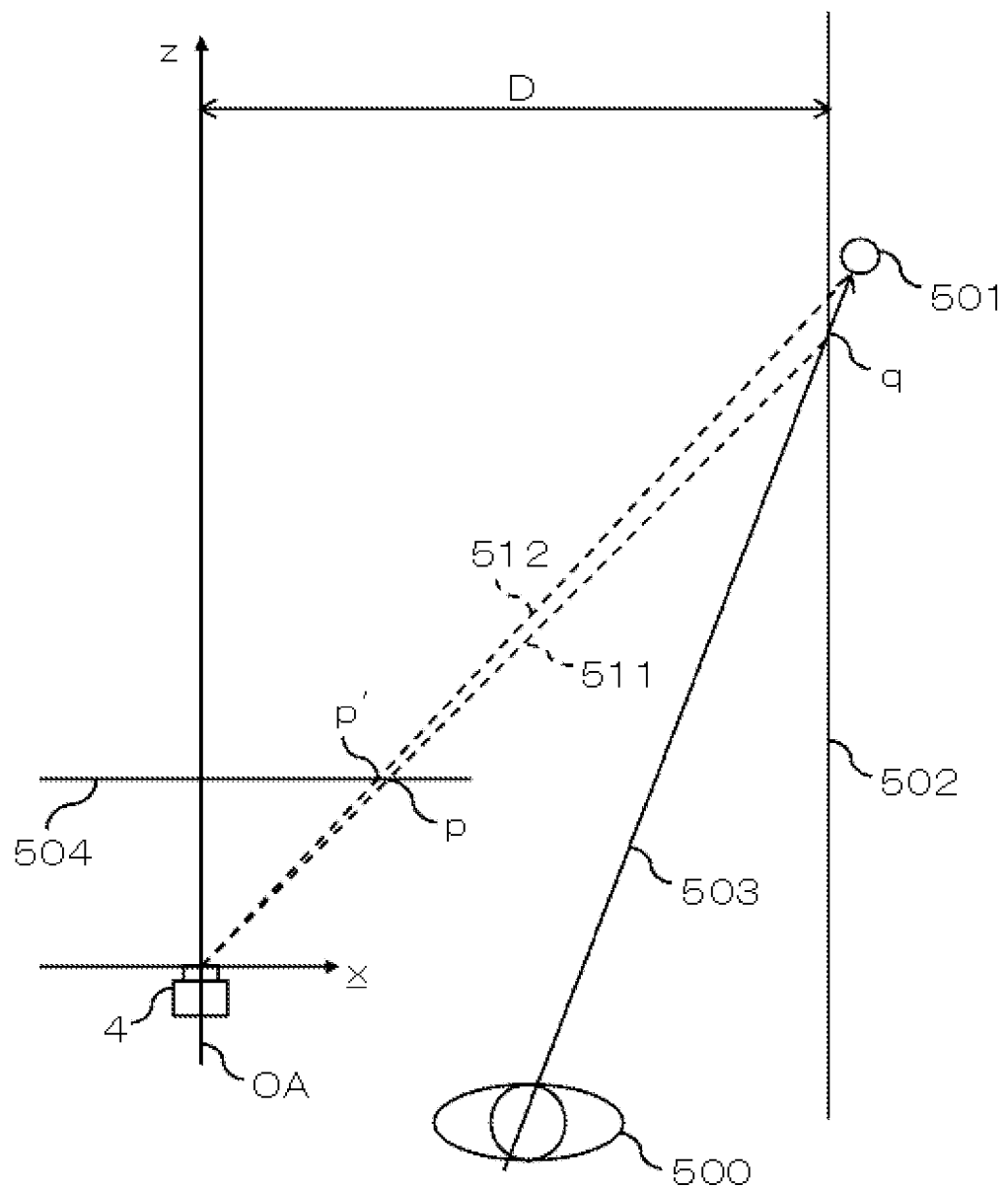
FIG. 5 is a diagram illustrating an example of a relationship between a gaze point on an outside-of-vehicle image and an intersection of a line of sight of a driver and a line-of-sight projection plane.

FIG. 5 is a diagram illustrating an example of a positional relationship between the gaze point on the outside-of-vehicle image and the intersection of the driver's line of sight and the line-of-sight projection plane. In a case where the distance D from the outside-of-vehicle image capturing unit 4 to a line-of-sight projection plane 502 is set such that an object 501 to be gazed at by a driver 500 is located close to the line-of-sight projection plane 502, an intersection q between a line of sight 503 of the driver 500 and the line-of-sight projection plane 502 is located close to the object-to-be-gazed-at 501. Therefore, even when the installation location of the outside-of-vehicle image capturing unit 4 is far from the driver 500, a difference is small between two angles, that is, an angle made by a line 511 extending from the outside-of-vehicle image capturing unit 4 to the intersection q and the optical axis OA of the outside-of-vehicle image capturing unit 4 and an angle made by a line 512 extending from the outside-of-vehicle image capturing unit 4 to the object-to-be-gazed-at 501 and the optical axis OA. Therefore, a location p, corresponding to the intersection q, on an image sensing area 504 of the outside-of-vehicle image capturing unit 4 is substantially coincident with a location p', corresponding to the object-to-be-gazed-at 501, on the image sensing area 504 of the outside-of-vehicle image capturing unit 4. Therefore, without having to actually measure the distance from the driver to the object-to-be-gazed-at, the control unit 6 is capable of putting the gaze point, on the outside-of-vehicle image, very close to the true location, on the outside-of-vehicle image, of the object-to-be-gazed-at gazed at by the driver.

There is a possibility that the imaging optical system has significantly large distortion as in a case where a fish-eye lens is used as the imaging optical system of the outside-of-vehicle image capturing unit 4. In such a case, for example, a correction table may be prepared and stored in the storage unit 5. More specifically, the correction table is produced so as to represent a correction amount of a difference in position on the outside-of-vehicle image due to the distortion for various angles with reference to the optical axis of the outside-of-vehicle image capturing unit 4, and the produced correction table is stored in the storage unit 5. The correction table may be produced by capturing an image of a chart of known patterns using the outside-of-vehicle image capturing unit 4 and analyzing the captured image. In a case where a distortion curve of the imaging optical system of the outside-of-vehicle image capturing unit 4 is known, the correction table may be produced based on the distortion curve.

The projection unit 14 calculates the angle made by the optical axis of the outside-of-vehicle image capturing unit 4 and a line extending from the front-side principal point of the outside-of-vehicle image capturing unit 4 to the intersection, and the projection unit 14 determines the correction amount depending on the calculated angle by referring to the correction table. Furthermore, the projection unit 14 determines a straight line, on the outside-of-vehicle image, extending from a pixel on the outside-of-vehicle image corresponding to the optical axis to the projected point p (determined according to equation (3)) on the outside-of-vehicle image corresponding to the intersection q. The projection unit 14 then determines the coordinates of the gaze point p, that is, the coordinates of the gaze point p are given by the distance along the determined straight line from the pixel corresponding to the optical axis to the projected point p minus the correction amount.

The projection unit 14 notifies the warning determination unit 16 of the coordinate of the gaze point p on the outside-of-vehicle image.

The object-to-be-gazed-at detection unit 15 detects an object to be paid attention to, on the outside-of-vehicle image, by the driver. For example, the object-to-be-gazed-at detection unit 15 divides the outside-of-vehicle image into a plurality of sub-images and extracts a feature value representing an object to be paid attention to from each sub-image. The object-to-be-gazed-at detection unit 15 inputs the feature value extracted from each sub-image into a discriminator configured to discriminate whether a given object is one to be paid attention to thereby determining whether each sub-image includes an image of an object to be paid attention to. For example, the discriminator may be an AdaBoost discriminator or a support vector machine. The feature value may be, for example, a Haar-like feature value.

The object-to-be-gazed-at detection unit 15 may use some tracking method to track an object to be paid attention to over a plurality of outside-of-vehicle images that are successive in time. Only in a case where an object is detected whose location on the outside-of-vehicle image is approaching the center of the outside-of-vehicle image, that is, when the object is approaching the vehicle 10, the object-to-be-gazed-at detection unit 15 may determine that the object is one to be paid attention to.

The object-to-be-gazed-at detection unit 15 notifies the warning determination unit 16 of information indicating an area including the image of the object to be paid attention to.

The warning determination unit 16 determines whether coordinates of a gaze point on the outside-of-vehicle image are included in an area of any object to be paid attention to. In a case where the coordinates of the gaze point are included in an area of some object to be paid attention to, the warning determination unit 16 determines that the driver has seen this object to be paid attention to.

In a case where an object to be paid attention to is included in an outside-of-vehicle image over an entire latest period with a predetermined length, the warning determination unit 16 determines whether the driver is looking at the object. Note that the predetermined length of the period may be set in range from 0.1 seconds to 1 second. In a case where the driver has not seen the object over the period, the warning determination unit 16 warns the driver, for example, by generating a warning sound from a speaker (not illustrated). Alternatively, the warning determination unit 16 may display, on a display (not illustrated) installed in the vehicle, a latest outside-of-vehicle image and a mark indicating the object to be paid attention to detected on the outside-of-vehicle image. For example, the mark may be a frame in a particular color surrounding the object.

Figure 6:
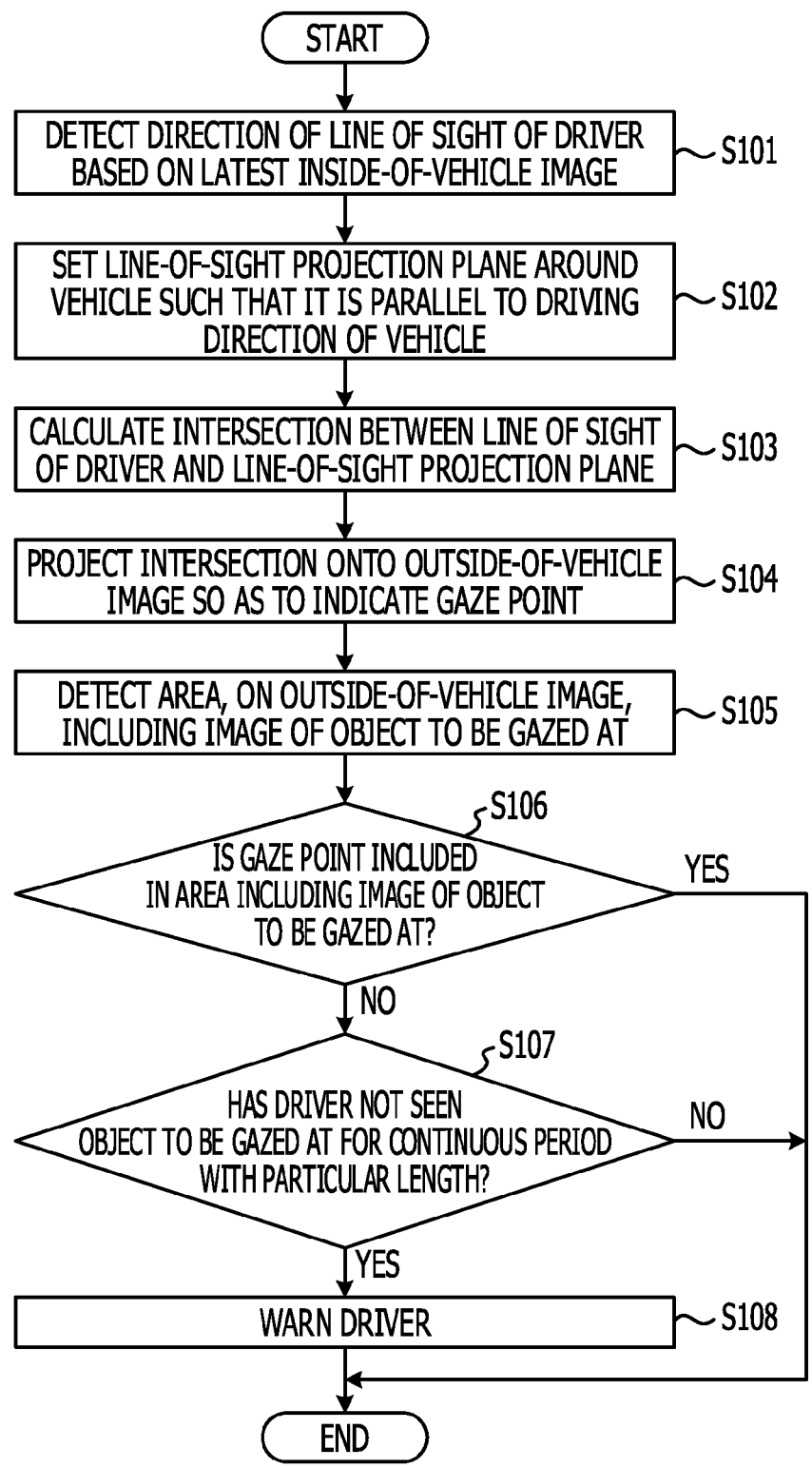
FIG. 6 is an operation flow chart of a drive assist process including a gaze point detection process.

FIG. 6 is an operation flow chart illustrating a drive assist process including a gaze point detection process controlled by the control unit 6. Whenever the control unit 6 receives an outside-of-vehicle image, the control unit 6 performs the drive assist process according to this operation flow chart.

The line-of-sight detection unit 11 detects a direction of the line of sight of the driver based on a latest inside-of-vehicle image received from the inside-of-vehicle image capturing unit 3 (step S101). The line-of-sight detection unit 11 sends a direction vector indicating the direction of the line of sight to the intersection calculation unit 13.

The line-of-sight projection plane setting unit 12 sets a line-of-sight projection plane such that the line-of-sight projection plane is parallel to the running direction of the vehicle 10 and is apart from the outside-of-vehicle image capturing unit 4 by a distance where there is a possibility that there is an object to be paid attention to (step S102). The line-of-sight projection plane setting unit 12 notifies the intersection calculation unit 13 of the line-of-sight projection plane.

The intersection calculation unit 13 calculates an intersection between the driver's line of sight and the line-of-sight projection plane (step S103). Note that the coordinates of the intersection may be represented in the world coordinate system. The intersection calculation unit 13 notifies the projection unit 14 of the coordinates of the intersection.

The projection unit 14 projects the intersection between the driver's line of sight and the line-of-sight projection plane onto the outside-of-vehicle image such that the gaze point is identified (step S104). The projection unit 14 notifies the warning determination unit 16 of the coordinates of the gaze point on the outside-of-vehicle image.

The object-to-be-gazed-at detection unit 15 detects an area, on the outside-of-vehicle image, including an image of an object to be paid attention to by the driver (step S105). The object-to-be-gazed-at detection unit 15 notifies the warning determination unit 16 of the location and the range of the area including the image of the object to be paid attention to.

The warning determination unit 16 determines whether the point, on the outside-of-vehicle image, gazed at by the driver is included in some one of the areas including any object to be paid attention to (step S106). In a case where the gaze point is not included in any area of the object to be paid attention to (the answer to step S106 is No), the warning determination unit 16 determines that the driver was not looking at the object to be paid attention to as of when the outside-of-vehicle image was generated. In this case, the warning determination unit 16 determines whether the driver does not look at the object to be paid attention to over a period equal to or greater than a predetermined value (step S107). In a case where the driver does not look at the object to be paid attention to over the period equal to or greater than the predetermined value (the answer to step S107 is Yes), the warning determination unit 16 warns the driver that there is an object to be paid attention to in the neighborhood of the vehicle 10 (step S108). The control unit 6 then ends the drive assist process.

On the other hand, if it is determined in step S106 that the driver's gaze point is within an area including the image of some object to be paid attention to (the answer to step S106 is Yes), then the warning determination unit 16 determines that the driver has seen the object to be paid attention to. In this case, the control unit 6 resets to 0 the length of the duration in which the driver has not seen the object to be paid attention to without being warned, and the control unit 6 then ends the drive assist process. In a case where it is determined in step S107 that the duration, during which the driver has not seen the object to be paid attention to, has not reached the predetermined value, (the answer to step S107 is No), the control unit 6 ends the drive assist process without warning the driver.

As described above, the drive assist apparatus including the gaze point detection device determines an intersection of a driver's line of sight and a line-of-sight projection plane set at a location where there is a possibility that there is an object to be paid attention to, and the drive assist apparatus projects the determined intersection onto an outside-of-vehicle image. Because of the nature of the line-of-sight projection plane, the drive assist apparatus is capable of representing the distance from the outside-of-vehicle image capturing unit to the object actually gazed to by the driver, in a good approximation, by the distance from the outside-of-vehicle image capturing unit to the intersection described above. Therefore, the drive assist apparatus provides high accuracy in identifying a gaze point on the outside-of-vehicle image without having to measure the distance from the outside-of-vehicle image capturing unit to the object actually gazed to by the driver. Because the drive assist apparatus does not have to measure the distance from the outside-of-vehicle image capturing unit to the object being actually gazed at by the driver, it is possible to simplify the structure of the drive assist apparatus.

Note that the embodiments are not limited to examples described above. For example, the gaze point detection device may be installed in an object-under-observation analysis apparatus configured to analyze an object seen by a driver during driving. The object-under-observation analysis apparatus may be configured in a similar manner to that of the drive assist apparatus described above with reference to FIG. 1. In this case, for example, the line-of-sight projection plane may be set depending on the distance from the outside-of-vehicle image capturing unit 4 to a location where there is a possibility that there is an object seen by the driver. For example, to identify a billboard gazed at by the driver, the line-of-sight projection plane may be set at a location apart from the outside-of-vehicle image capturing unit 4 by a distance where the billboard is assumed to exist such that the line-of-sight projection plane is parallel to the running direction of the vehicle 10.

In this example, the object-under-observation analysis apparatus may further include, for example, a location detection unit (not illustrated) configured to detect the current location of the vehicle 10 based on position information supplied from a Global Positioning System (GPS) satellite of a GPS system. A storage unit of the object-under-observation analysis apparatus may store map information representing locations and contents of billboards in an area in which the vehicle 10 is running.

In this example, based on the current location of the vehicle 10, the object-to-be-gazed-at detection unit 15 of the control unit 6 reads out a template corresponding to a billboard located in the neighborhoods of the current location of the vehicle 10 from the storage unit 5. The object-to-be-gazed-at detection unit 15 then performs template matching between the outside-of-vehicle image and the template to detect an area of the outside-of-vehicle image that best matches the template. The object-to-be-gazed-at detection unit 15 determines that the detected area includes an image of the billboard corresponding to the template.

In a case where the gaze point of the driver is in the area, on the outside-of-vehicle image, in which the image of the billboard exists, the warning determination unit 16 of the control unit 6 determines that the driver has seen the billboard. In a case where the warning determination unit 16 determines that the driver has seen the billboard over a latest period with a predetermined length during which a sequence of outside-of-vehicle images are acquired, the warning determination unit 16 reads out the content of the advertisement of the billboard gazed at by the driver from the storage unit 5. The warning determination unit 16 then refers to the map information to detect a store associated with the content of the advertisement of the billboard gazed at by the driver within a particular area (for example, an area of 2 km×2 km) around the current location of the vehicle 10. For example, when the content of the advertisement of the billboard gazed at by the driver is an advertisement of a restaurant, the warning determination unit 16 detects the restaurant. The warning determination unit 16 displays, on a display (not illustrated) installed in the vehicle 10, a map of the neighborhood of the current location of the vehicle 10 and information indicating the name and the location of the detected store.

In an alternative example, the object-under-observation analysis apparatus includes a communication unit (not illustrated) configured to wirelessly communicate with a base station of a mobile communication system installed outside the vehicle 10 such that the object-under-observation analysis apparatus is capable of communicating with, for example, a server installed at a particular location outside the vehicle 10 such as a data center via the base station. In this example, the object-under-observation analysis apparatus transmits a signal indicating information on the current location of the vehicle 10, the location of the billboard gazed at by the driver, and the content of the advertisement to the server via the communication unit and the base station. The server refers to the map information to detect a store associated with the content of the advertisement of the billboard gazed at by the driver within a particular area around the current location of the vehicle 10. The server returns information indicating the name and the location of the detected store to the object-under-observation analysis apparatus installed in the vehicle 10. The control unit 6 of the object-under-observation analysis apparatus displays, on a display (not illustrated) installed in the vehicle 10, a map of the neighborhood of the current location of the vehicle 10 and information indicating the name and the location of the detected store.

In a still another example, the control unit 6 adds a mark to each outside-of-vehicle image generated in a period with a predetermined length when the vehicle 10 is running and stores the outside-of-vehicle images added with the marks in the storage unit 5. This makes it possible for the object-under-observation analysis apparatus to analyze the movement of the driver's line of sight by tracking the gaze point on the outside-of-vehicle image in the period.

A computer program that realizes functions of various units in the control unit in the examples and the modifications thereto according to the embodiments may be provided in such a manner that the computer program is stored in a computer-readable removable storage medium such as a semiconductor memory, a magnetic storage medium, an optical storage medium, or the like. Note that the storage medium does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A gaze point detection device comprising:
   an image processor; and a memory which stores a plurality of instructions, which when executed by the image processor, cause the image processor to execute,
   an outside-of-vehicle image capturing unit to capture an image of at least part of a scene around a vehicle;
   detecting a direction of a line of sight of a person in the vehicle based on an inside-of-vehicle image taken by an inside-of-vehicle image capturing unit;
   setting a line-of-sight projection plane in at least part of a region around the vehicle such that the plane is along the running direction of the vehicle and apart from the vehicle by the distance where there is a possibility that there is an object gazed at by the person in the vehicle;
   determining an intersection between the plane and a line of sight of the person in the vehicle;
   projecting the intersection onto the outside-of-vehicle image and presenting a resultant projected point on the outside-of-vehicle image as a gaze point gazed at by the person in the vehicle; and
   detecting the object to be gazed at on the outside-of-vehicle image by the person.

2. The device according to claim 1,
wherein the setting includes detecting, on the image, a center line or an edge of a road on which the vehicle runs, and setting the plane at a location corresponding to the center line or the edge of the road.

3. A gaze point detection method comprising:
capturing an image of at least part of a scene around a vehicle and an inside-of-vehicle image;
detecting a direction of a line of sight of a person in the vehicle based on the inside-of-vehicle image;
setting a line-of-sight projection plane in at least part of a region around the vehicle such that the plane is along the running direction of the vehicle and apart from the vehicle by the distance where there is a possibility that there is an object gazed at by the person in the vehicle;
determining an intersection between the plane and a line of sight of the person in the vehicle;
projecting the intersection onto the outside-of-vehicle image and presenting a resultant projected point on the outside-of-vehicle image as a gaze point gazed at by the person in the vehicle; and
detecting the object to be gazed at on the outside-of-vehicle image by the person.

4. The method according to claim 3,
wherein the setting includes detecting, on the image, a center line or an edge of a road on which the vehicle runs, and setting the virtual plane at a location corresponding to the center line or the edge of the road.

5. A non-transitory computer-readable storage medium storing a gaze point detection program that causes a computer to execute a process comprising:
capturing an image of at least part of a scene around a vehicle and an inside-of-vehicle image;
detecting a direction of a line of sight of a person in the vehicle based on the inside-of-vehicle image;
setting a line-of-sight projection plane in at least part of a region around the vehicle such that the plane is along the running direction of the vehicle and apart from the vehicle by the distance where there is a possibility that there is an object gazed at by the person in the vehicle;
determining an intersection between the plane and a line of sight of the person in the vehicle;
projecting the intersection onto the outside-of-vehicle image and presenting a resultant projected point on the outside-of-vehicle image as a gaze point gazed at by the person in the vehicle; and
detecting the object to be gazed at on the outside-of-vehicle image by the person.

6. The computer-readable storage medium according to claim 5,
wherein the setting includes detecting, on the image, a center line or an edge of a road on which the vehicle runs, and setting the virtual plane at a location corresponding to the center line or the edge of the road.

* * * * *